July 25, 1967 J. F. SCHANNE 3,333,110

ELECTRONICALLY VARIABLE DELAY LINE

Filed June 23, 1964

INVENTOR.
JOSEPH F. SCHANNE
BY J. C. Whittaker
Attorney

United States Patent Office 3,333,110

Patented July 25, 1967

3,333,110

ELECTRONICALLY VARIABLE DELAY LINE

Joseph F. Schanne, Philadelphia, Pa., assignor to Radio Corporation of America, a corporation of Delaware Filed June 23, 1964, Ser. No. 377,259
13 Claims. (Cl. 307—88.5)

This invention relates to delay lines and, particularly, to an improved electronically variable delay line and a coupling circuit for use therein.

Electronically variable delay lines are known which consist of a series of cascaded iterative sections, each containing a storage capacitor, an electronically operated switch, and a coupling circuit. A signal supplied to the input terminals of the delay line is delayed by sampling the signal and transferring the signal samples from section to section down the line. The storage capacitors of the various sections store the signal samples, while the switches and coupling circuits act to periodically transfer the signal samples between the storage capacitors in the respective sections. The output of the delay line includes a device such as a low pass filter for restoring the sampled increments to the original signal.

In the operation of a delay line of this type, the storage capacitor of the first section is connected in such a manner that when the switch included in the first section is closed to provide a sample, the storage capacitor of the first section charges to a voltage corresponding to the instantaneous voltage level and polarity of a signal applied to the input of the delay line. The first storage capacitor having been charged, the switch included in the first section is opened and, after a delay, the switch included in the second section is closed for a short interval. During this interval the storage capacitor of the second section charges to a voltage equal to that across the storage capacitor of the first section. This process takes place at each succeeding section of the delay line and the sample increment is transferred down the line. The amount of delay imparted to the input signal is determined by the rate at which the switches are operated and the total number of sections included in the delay line.

The storage capacitor of each section of the delay line is charged through a coupling circuit which obtains its input from the storage capacitor of the previous section of the delay line. The coupling circuit preferably offers a high impedance to the storage capacitor connected to its input terminals and a low impedance to the storage capacitor connected to its output terminals. In addition to high input impedance and low output impedance, the coupling circuit should provide unity voltage gain.

A high input impedance in the coupling circuit is desirable in order to prevent leakage of the charge stored on a storage capacitor. A low output impedance is desirable to facilitate rapid charging or discharging of the storage capacitor connected at the output of the coupling circuit. In prior electronically variable delay lines it has been suggested that the coupling circuit take the form of a conventional unity voltage gain amplifier. An emitter follower type of transistor amplifier is desirable since it offers in a simple circuit, unity voltage gain, high input impedance and generally low output impedance. One problem encountered in the use of such an amplifier is the non-linearity of its output impedance where the output transistor experiences states of conduction and non-conduction. While such amplifiers exhibit a low output impedance during states of conduction, they exhibit relatively high output impedances during states of non-conduction.

In applications where the storage capacitor in a section of the delay line is arranged to discharge through the output terminals of the coupling circuit, and the coupling circuit takes the form of a conventional unity voltage gain amplifier of the emitter-follower type, the discharging capacitor renders the amplifier non-conducting. The storage capacitor discharges through the high output impedance of the amplifier. This high output impedance results in a long time constant which has, in the past, limited the rate at which the switches in the respective sections can be usefully operated and, therefore, the range of delay times possible in the operation of a given delay line.

It is therefore an object of the present invention to provide a new and improved electronically variable delay line.

It is a further object of the present invention to provide an improved unity voltage gain coupling circuit.

A still further object is to provide an improved low output impedance coupling circuit for use in an electronically variable delay line to increase the range of delay times possible from the delay line over that otherwise obtainable.

Briefly, in one embodiment of the invention described herein, an electronically variable delay line is provided including a plurality of sections each consisting of a switch or gate, a storage capacitor and a coupling circuit. The desired characteristics of the coupling circuit are obtained by employing a unity voltage gain amplifier, which in general has states of both high and low output impedance, and an impedance controlling circuit connected in the output circuit of the amplifier. The impedance controlling circuit includes a controlled variable impedance connected across the output terminals of the amplifier. The variable impedance is controlled in relation to the state of conduction of the amplifier to provide a consistently low impedance between the output terminals of the amplifier. When the amplifier is in a state of high output impedance the controlled impedance is low and when the amplifier is in a state of low output impedance the controlled impedance is high. Thus, the impedance offered to the storage capacitor connected to the output of the amplifier is consistently low regardless of the state of conduction of the amplifier. In a preferred embodiment, the controlled impedance takes the form of a transistor. The emitter-collector path is connected across the output terminals of the amplifier and the base serves as a control terminal. A voltage developed in the amplifier circuit which is a function of the amplifier's state of conduction is fed to the base of the transistor to control the conduction of the collector-emitter path.

A more detailed description of the invention will now be given in connection with the accompanying drawing, in which.

Figures 1, 2, 3:
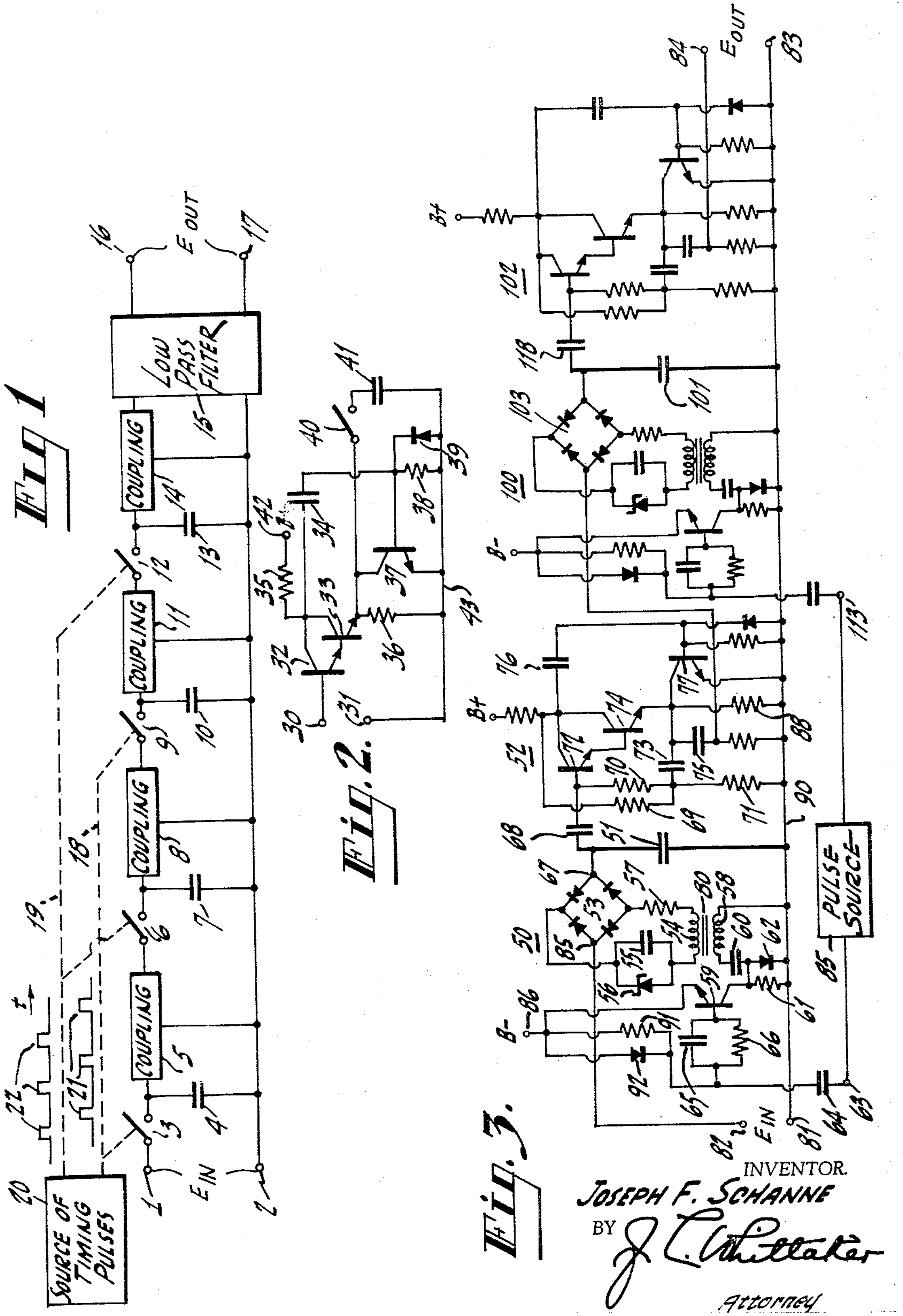
FIG. 1 is a block diagram of an electronically variable delay line of the general type with which the invention is concerned.
FIG. 2 is a circuit diagram of a coupling circuit constructed according to an embodiment of the invention.
FIG. 3 is a schematic diagram of a delay line including two delay sections constructed according to the embodiment of the invention shown in FIG. 2.

FIG. 1 shows an electronically variable delay line. The delay line comprises a plurality of cascaded iterative sections each consisting of a switch which may be an electronic gate of well-known type, a coupling circuit, which is preferably constructed according to the present invention, and a storage capacitor. The switch or gate 3 of the first section is connected in series with a capacitor 4 across the input terminals 1, 2 of the delay line.

A coupling circuit 5 is provided between the capacitor 4 and the output of the first section. The subsequent sections are identical in construction to the first. Switches of successive stages are 6, 9 and 12; storage capacitors of successive stages are 7, 10 and 13; and couplings between successive stages are 8, 11 and 14. The line terminates in a low pass filter 15 of conventional construction. The output signal is taken from the output of the filter 15 at the terminals 16 and 17. The switches or electronic gates for the various sections are operated by suitable means represented by the two leads 18 and 19. The leads 18, 19 serve to apply timing signals to the switches from a suitable source of timing pulses 20. The switches 3 and 9 are operated by the timing signals supplied over lead 18 and the switches 6 and 12 are operated by the timing signals supplied over lead 19. While only four sections of the line are shown in FIG. 1, it is to be understood that the number of sections may be more or less.

The operation of the electronically variable delay line of FIG. 1 is as follows. The source of timing pulses 20 generates a series of very short, positive going pulses 21 on the lead 18. During each pulse interval the two switches 3 and 9 are closed. When no pulse is present on the line 18, the switches 3 and 9 are open. The period between successive pulses generated on lead 18 by the source 20 is longer than the length of the pulses themselves as indicated by the train of pulses 21. Thus, the switches 3 and 9 are closed for much shorter intervals than they are opened. The operation of the two switches 6 and 12 is similar to that of the switches 3 and 9. The switches 6 and 12 are operated by positive going pulses 22 occurring on the lead 19. Again the length of the pulses which close the switches 6 and 12 is much shorter than the interval between pulses during which the switches 6 and 12 are open as shown by the train of pulses 22. The pulses on the lead 19 occur during intervals between pulses on lead 18. Thus, the switches 6 and 12 are closed during intervals when the switches 3 and 9 are open, and switches 3 and 9 are closed during intervals when the switches 6 and 12 are open.

The signal to be delayed, $E_{in}$, is applied to the input terminals 1, 2 of the delay line. The switch 3 is periodically opened and closed by the pulses occurring on lead 18, to provide a sampling of the input signal $E_{in}$. During each interval when the switch 3 is closed, the storage capacitor 4 charges to a level equal to the value of the input signal voltage $E_{in}$, during that interval. After the short sampling pulse on lead 18 terminates, the switch 3 is opened. The switch 6 is then closed by a pulse occurring on the lead 19 connecting the storage capacitor 7 of the second section to the coupling circuit 5. The characteristics of the coupling circuit 5 are such that the capacitor 7 charges to a voltage equal to that across the first storage capacitor 4. The storage capacitor 7 charges through the output of the coupling circuit 5 which preferably offers a low output impedance permitting rapid charging of the storage capacitor 7. After the termination of the pulse on the lead 19 the switch 6 opens. The switches 3 and 9 are again closed by a pulse occurring on the lead 18 to permit the first storage capacitor 4 to charge to the new level of the input voltage $E_{in}$ and at the same time permitting the third storage capacitor 10 to charge to a voltage level equal to that across the storage capacitor 7 through the coupling circuit 8. After the storage capacitors 4 and 10 have charged to their respective levels, the switches 3 and 9 are opened at the termination of the pulse on the lead 18. The switches 6 and 12 are again closed by a pulse on lead 19. With the switches 6 and 12 closed, the storage capacitor 13 charges to the level of the charge on capacitor 10 through the coupling circuit 11, and the storage capacitor 7 charges or discharges to the level of the charge on the storage capacitor 4 through the coupling circuit 5. Thus it is seen that as the various switches are operated by the timing signals supplied over leads 18 and 19, the samples of the input signal $E_{in}$ are transferred down the line. The low pass filter 15 serves to restore the samples to the original signal. The output signal $E_{out}$ is obtained from the output of the low pass filter 15.

The total delay introduced between the input and output of the delay line is:

$$T=\frac{n}{2f_s}$$

where $n$ is the total number of sections, four in FIG. 1, and $f_s$ the sampling or switching frequency, i.e., the frequency at which the various switches are operated. Thus it can be seen that the delay may be varied by varying the switching frequency $f_s$.

The range over which the delay may be varied can be expressed as, $$\Delta T=\frac{n}{2}\left(\frac{1}{f_{s\ min.}}-\frac{1}{f_{s\ max.}}\right)$$

where $f_{s\ min}$ is the lowest switching frequency at which the line may be operated and $f_{s\ max}$ is the highest switching frequency at which the line may be operated. The lowest switching frequency, $f_{s\ min}$, corresponding to the longest delay, is limited primarily by the frequency of the incoming signal. Since the line operates on the sampling principle, the absolute minimum which $f_{s\ min}$ may attain is determined by the sampling theorem, $$f_{s\ min}\geq 2f$$

where $f$ is the frequency of the incoming signal to be delayed. For practical reasons it is generally desirable to sample at no less than three times the frequency of the input. Therefore, as a general rule, $f_{s\ min}$ is substantially higher than $2f$.

The highest switching or sampling frequency at which the line may be operated, $f_{s\ max}$, corresponding to the shortest delay, is determined primarily by the time constants of the line. Time constants of concern are those involved in transferring samples from one storage capacitor to the next through a coupling circuit. The time constant of primary concern is that introduced by the output impedance of the coupling circuit.

In general the input signal, $E_{in}$, will vary both in a positive direction and in a negative direction, for example, where it is sinusoidal. Thus, in general, the information in the form of voltage across a capacitor of one section, e.g. capacitor 4 of FIG. 1, will reach values both lower and higher than that across the capacitor of the subsequent section, capacitor 7 of FIG. 1. In the former situation where the voltage across the capacitor 4 is lower than that across capacitor 7, the input voltage to the coupling circuit 5 is lower than that across the capacitor 7 of the next section. When the switch 6 connecting the two sections is closed, the voltage on the capacitor 7 should decrease to the value of the voltage across the storage capacitor 4. In order to do this it should discharge through the output terminals of the coupling circuit 5. If, as in some prior arrangements, the coupling circuit 5 takes the form of a conventional unity voltage gain amplifier of the emitter-follower type, it cuts off or is driven into a state of non-conduction by the voltage placed across its output terminals and thereby offers a relatively high impedance to the discharging capacitor 7. This high impedance results in a long time constant which limits the maximum switching frequency at which the line may be operated. By employing the coupling circuit shown in FIG. 2, and particularly the output circuit shown therein, the discharging capacitor is offered a low impedance, thus decreasing the discharge time and providing a relatively high value for $f_{s\ max}$.

In FIG. 2 there is shown a coupling circuit constructed in accordance with an embodiment of the present invention for use in a delay line such as that described above. Certain bias circuitry has been omitted for the sake of clarity. The coupling circuit comprises three NPN transistors. The collectors of the first two transistors 32 and 33 are connected together and through a resistor 35 to the positive terminal 42 of a source of unidirectional potential. The base of the first transistor 32 forms the input to the circuit and is shown as connected to a first input terminal 30. The base of the second transistor 33 is directly connected to the emitter of the first transistor 32. The emitter of the second transistor 33 is connected through a resistor 36 to the second input terminal 31 at reference potential over a return path 43. The output circuit, which includes a capacitor 41 and a switch 40 in series is connected across this resistor 36. The third transistor 37 is connected with its emitter-collector path shunting the output resistor 36 and its base coupled to the collectors of the first and second transistors 32 and 33 through a capacitor 34. A diode 39 and a resistor 38 are connected in parallel between the base of the third transistor 37 and return line 43.

The operation of the coupling circuit of FIG. 2 is as follows. The input stage consisting of the two transistors 32 and 33 offers a very high input impedance. Neglecting the third transistor 37 for the moment, the output of the first two transistors 32, 33 is similar to an emitter follower where the transistor 33 supplies current to a load resistor 36 connected to its emitter. The output impedance of this configuration is relatively low, allowing rapid charging of the capacitor 41 to the value of the voltage across the input terminals 30, 31 when the switch 40 is closed. Assuming, however, that there is a voltage stored across the capacitor 41 prior to the closing of the switch 40 which is greater than the volatge across the input terminals 30, 31, the capacitor 41 discharges through the output circuitry of the coupling circuit until it reaches the input value. In such a situation the voltage at the emitter of the transistor 33 is more positive than the voltage at its base and therefore the transistor cuts off. Thus, in the absence of the transistor 37 the capacitor 41 discharges primarily through the output resistor 36 which is in general too large to allow a very rapid discharge.

Transistor 37 is connected with its emitter-collector path in parallel with the output resistor 36 and with its base coupled through a capacitor 34 to the collector of the transistor 33. Thus, when the switch 40 is closed and the transistor 33 is driven into non-conduction by a voltage stored on the capacitor 41, the voltage on the collector of transistor 33 becomes more positive. This positive rise in voltage is coupled through the capacitor 34 to the base of the transistor 37, driving that transistor 37 into conduction. The high current demand of the collector circuit of the transistor 37 permits a rapid discharge of the capacitor 41. When the voltage across the capacitor 41 has decreased to the voltage across the input terminals 30, 31, the transistor 33 again conducts and the transistor 37 is rendered nonconducting by a negative-going voltage pulse coupled from the collector of the transistor 33 to the base of the transistor 37 through the capacitor 34. The diode 39 between the base of the transistor 37 and the return path 42 prevents excessive reverse biasing of the transistor 37. The resistor 38 between the base of the transistor 37 and the return path 42 provides a current path for charging the coupling capacitor 34. By proper choice of elements, the impedance seen by the capacitor 41 may be made substantially constant regardless of the current direction through the capacitor 41. The time constants for charging and discharging the capacitor 41 are both very low and may be made substantially equal by proper choice of component values. Thus, when the coupling circuit is used in a delay line such as described above, the delay line may be operated at high frequencies and a wide range of delay is available for a particular length of line.

An example of a two section delay line embodying the present invention is shown in FIG. 3. The signal to be delayed, $E_{in}$, is supplied at the input terminals, 81, 82 of the first section of the line. The first section of the delay line comprises an electronic gate shown generally at 50, a storage capacitor 51, and a coupling circuit 52. The second section comprising corresponding elements 100, 101, and 102 is identical in construction to the first. The timing pulses for the switches 50 and 100 are supplied to the terminals 63 and 113, respectively, from a pulse source 85. The output signal, $E_0$ at the output terminals 83 and 84, may be fed to a low-pass filter (not shown).

The construction of the electronic gates 50 and 100 is conventional. Referring to the gate 50, the timing signals appearing at the terminal 63 are coupled to the base of a transistor 59 through a capacitor 64 and the parallel combination of a capacitor 65 and a resistor 66. The collector of the transistor 59 is connected to a resistor 61 and to a diode 62 which are connected to a line 90 of reference potential. The emitter of the transistor 59 is coupled to a source of negative potential at the terminal 86. The terminal 86 is also connected through a resistor 91 and a diode 92 to the capacitor 64. The collector of the transistor 59 is also connected to a capacitor 60 which is connected to one side of the primary winding 58 of a transformer 80. The secondary 54 of the transformer 80 is connected across opposite terminals of the diode bridge 53 through a resistor 57 and the parallel combination of a capacitor 55 and a Zener diode 56. One input terminal 82 is connected to a terminal 85 of the diode bridge 53. The terminal 67 of the diode bridge 53 is connected to the storage capacitor 51 and the coupling capacitor 68.

The conduction of the diode bridge 53 is controlled by the timing signal in the form of pulses supplied to the terminal 63 from the pulse source 85. A positive pulse from the source 85 is coupled through the capacitors 64 and 65 to the base of the transistor 59 driving that transistor into a state of conduction. The resistor 91 provides a current path for the charging capacitor 64, while the diode 92 provides a low impedance discharge path. The decrease in the potential at the collector of the transistor 59 resulting from the transistor 59 being driven into a state of conduction causes a current to flow through the primary winding 58 of the transformer 80. The diode 62 provides a current path for the inductive current when the transistor 59 is turned off. The current in the primary 58 induces a current in the secondary 54 of the transformer 80. The secondary current flows through the resistor 57, the diode bridge 53, which bridge acts as a switch, and the Zener diode 56. When the diode bridge is so rendered into a state of conduction, the path between the input terminal 82 and output terminal 67 of the diode bridge 53 is electrically completed. Thus the storage capacitor 51 charges to the value of the input voltage $E_{in}$. The parallel combination of the capacitor 55 and the Zener diode 56 provide a back bias for the diode bridge 53, to maintain the bridge in a non-conducting state (the switch open) between the pulses from transistor 59.

The coupling circuit 52 of the first section is essentially the same as that described with respect to FIG. 2 above. Certain bias circuitry which was omitted in FIG. 2 for the sake of clarity is included in FIG. 3. The resistors 69, 70 and 71 provide a bias for the modified emitter follower circuit comprising the transistors 72 and 74. A capacitor 73 is connected between the common point of the three resistors 69, 70 and 71 and the emitter of the transistor 74. The purpose of this capacitor is to provide a "bootstrap" effect. The output of the coupling circuit 52 is taken across the resistor 88 through the capacitor 75.

The operation of the coupling circuit is essentially the same as that of the coupling circuit described with respect to FIG. 2 above. The purpose of the capacitor 73 is to provide a negative feedback "bootstrap" effect. This increases the input impedance of the amplifier. As noted above, a high input impedance is desirable to prevent leakage of the storage capacitor 51.

If the voltage appearing across the second storage capacitor 101 is greater in a positive sense than that appearing across the first storage capacitor 51 and the second switch 100 is closed by applying a pulse to the terminal 113, the two transistors 72 and 74 of the first coupling circuit 52, which are normally conducting, are driven into non-conduction by the positive voltage applied through the switch via capacitor 75 to the emitter of transistor 74. The collectors of these two transistors are then raised to a more positive potential. This rise in potential is coupled through a capacitor 76 to the base of the output transistor 77, causing the transistor 77 to conduct.

The high current demand created in the collector circuit of the transistor 77 provides a low impedance discharge path for the second storage capacitor 101 via the second switch 100, capacitor 75 and transistor 77. Once the voltage on the second storage capacitor 101 reaches the value across the first storage capacitor 51 as the capacitor 101 discharges, the first two transistors 72 and 74 are rendered conducting and the output transistor 77 is rendered non-conducting.

By employing a coupling circuit constructed as shown in the delay line of FIG. 3, the maximum sampling or switching frequency at which the switches 50 and 100 may be usefully operated is substantially increased over the maximum sampling frequency possible in the prior delay lines of this type. The increase in the maximum sampling frequency possible in the operation of a given delay line having a fixed number of sections produces a corresponding increase in the range of delays available with the delay line.

The storage capacitors 51 and 101 are D.C. isolated from the other circuit elements. This is seen by referring to the storage capacitor 101. This capacitor 101 is isolated from coupling circuit 102 by a relatively large capacitor 118 and isolated from the coupling circuit 52 by a relatively large capacitor 75. Generally it is desirable to provide such isolation for the storage capacitor of any particular section in order to prevent the storage capacitor from attaining a D.C. level. Such isolation prevents nonlinearity in the leakage discharge rate of the storage capacitor thereby avoiding distortion.

The output signal, $E_0$, appearing at the terminals 83, 84 is fed to a low pass filter or other suitable means, not shown, to provide smoothing and restoration of the input signal as delayed by the delay line.

What is claimed is:

1. A delay line comprising, (a) a plurality of cascaded devices each having two input terminals and two output terminals, (b) a plurality of storage capacitors each individually coupled across said input terminals of a respective one of said devices, (c) a plurality of switching means for periodically coupling said output terminals of each of said devices to the storage capacitor connected across the input terminals of the next successive one of said devices, and (d) means included in each of said devices for controlling the voltage across the storage capacitor periodically coupled to its output terminals by charging or discharging said last mentioned storage capacitor through an impedance which has substantially the same value both when said last mentioned storage capacitor is charging and when it is discharging until the voltage across said last mentioned storage capacitor reaches a value equal to the voltage across the input terminals of said device.

2. A delay line comprising, (a) a plurality of cascaded devices each having two input terminals and two output terminals, (b) a plurality of storage capacitors each individually coupled across the input terminals of a respective one of said devices, (c) switching means for periodically coupling the output terminals of each of said devices except the last of said devices to the said storage capacitor connected across the input terminals of the next successive one of said devices, (d) a separate unity voltage gain amplifier included in each of said devices which operates to determine the output impedance of said device according to the state of conduction of said amplifier, and (e) a separate variable impedance means included in each of said devices and connected between the output terminals of each of said devices for maintaining the output impedance of each device as presented to the one of said storage capacitors coupled to the output terminals thereof by said switching means substantially constant regardless of the state of conduction of said amplifier.

3. A delay line comprising, (a) a plurality of cascaded devices each having two input terminals and two output terminals, (b) a plurality of storage capacitors each individually coupled across the input terminals of a respective one of said devices, (c) switching means for periodically coupling the output terminals of each of said devices except the last of said devices to the said storage capacitor connected across the input terminals of the next successive one of said devices, (d) a separate unity voltage gain amplifier included in each of said devices which operates to affect the output impedance of said device according to the state of conduction of said amplifier, (e) a separate transistor included in each of said devices having a base, an emitter and a collector, said emitter and said collector being connected to respective output terminals of said amplifier, and (f) means for coupling said base to said amplifier to control the conduction of said transistor so that the impedance presented to the storage capacitor periodically coupled to the output terminals of said device is substantially constant regardless of the state of conduction of said amplifier.

4. A delay line comprising, (a) a plurality of cascaded devices each having two input terminals and two output terminals, (b) a plurality of storage capacitors each individually coupled across the input terminals of a respective one of said devices, (c) switching means for periodically coupling the output terminals of each of said devices except the last of said devices to the said storage capacitor connected across the input terminals of the next successive one of said devices, (d) first and second transistors included in each of said devices, the collectors of said transistors connected together and to one side of a source of direct current through a resistor, the base of said first transistor corresponding to one input terminal of said device, the emitter of said first transistor connected to the base of said second transistor, the emitter of said second transistor connected through a second resistor to the second input terminal of said four terminal devices and to the other side of said source of direct current, and (e) a third transistor included in each of said devices having its emitter-collector path connected in parallel with said second resistor and having its base capacitively coupled to the collectors of said first two transistors.

5. A low output impedance coupling circuit comprising, (a) an amplifier having two input terminals and two output terminals, the voltage across said output terminals being a function of the voltage across said input terminals, (b) a load connected across said output terminals said load comprising a fixed impedance and a variable impedance, (c) means for varying said variable impedance so that the value of said variable impedance is high when the output impedance of said amplifier is low and the value of said variable impedance is low when the output impedance of said amplifier is high.

6. In a delay circuit comprising a plurality of cascaded capacitors, an amplifier for coupling said capacitors
(a) said amplifier having states of high output impedance and low output impedance and having input terminals and output terminals,
(b) a transistor having a base, an emitter and a collector, the emitter and collector of said transistor being connected to respective ones of said output terminals of said amplifier,
(c) and means for coupling the base of said transistor to said amplifier so that said transistor is in a state of non-conduction when said output impedance is low and in a state of conduction when said output impedance is high.

7. In a delay circuit comprising a plurality of cascaded capacitors, an amplifier for coupling said capacitors
(a) said amplifier having states of conduction and non-conduction and having input terminals and output terminals, the impedance between said output terminals being high when said amplifier is non-conducting and low when said amplifier is conducting,
(b) a transistor having a base, an emitter and a collector, said emitter and said collector being connected to respective ones of said output terminals,
(c) and means coupling said base of said transistor to said amplifier so that said transistor is conducting when said amplifier is non-conducting and said transistor is non-conducting when said amplifier is conducting.

8. A low output impedance circuit comprising,
(a) an amplifier having states of conduction and non-conduction and having input terminals and output terminals, the impedance between said output terminals being high when said amplifier is non-conducting and low when said amplifier is conducting, said amplifier including a circuit point the potential at which is a function of the state of conduction of said amplifier,
(b) a transistor having a base, an emitter and a collector, said emitter and said collector being connected to respective ones of said output terminals,
(c) and means coupling the base of said transistor to said circuit point so that said transistor is conducting when said amplifier is non-conducting and said transistor is non-conducting when said amplifier is conducting.

9. A circuit having input terminals and output terminals for developing a voltage across a capacitor equal to a second voltage placed across said input terminals, said circuit comprising,
(a) an amplifier having input terminals corresponding to said input terminals of said circuit and output terminals, the voltage across said output terminals of said amplifier tending to be made equal to the voltage across said input terminals of said amplifier, said capacitor being connected across said output terminals of said amplifier, the output impedance of said amplifier being low when said capacitor is charging and high when said capacitor is discharging,
(b) a transistor having a base, an emitter and a collector, the emitter-collector path of said transistor being connected in parallel with said capacitor,
(c) and means for coupling the base of said transistor to said amplifier so that said transistor is conducting when said capacitor is discharging and non-conducting when said capacitor is charging.

10. A circuit for charging a first capacitor to a voltage which is a linear function of the voltage across a second capacitor, said circuit comprising,
(a) an amplifier having input terminals and output terminals, said second capacitor coupled to said input terminals and said first capacitor coupled to said output terminals,
(b) means connected across the output terminals of said amplifier for controlling the impedance presented to said first capacitor such that said impedance is substantially constant whether said first capacitor is charging or discharging.

11. A circuit for charging a first capacitor to a voltage which is a linear function of the voltage across a second capacitor, said circuit comprising,
(a) an amplifier having states of high output impedance and low output impedance and having input terminals and output terminals, said first capacitor coupled to said output terminals and said second capacitor coupled to said input terminals,
(b) a transistor having a base, an emitter and a collector, the emitter and collector of said transistor being connected across the output terminals of said amplifier,
(c) and means for coupling the base of said transistor to said amplifier so that the emitter-collector path of said transistor provides a low impedance discharge path for said first capacitor when the output impedance of said amplifier is high.

12. A circuit for charging a first capacitor to a voltage which is a linear function of the voltage across a second capacitor, said circuit comprising,
(a) an amplifier having states of conduction and non-conduction and having input terminals and output terminals, said first capacitor coupled to said output terminals and said second capacitor coupled to said input terminals, the output impedance of said amplifier being a function of the state of conduction of said amplifier, said amplifier including a circuit point the potential of which is a function of the state of conduction of said amplifier,
(b) a transistor having a base, an emitter and a collector, said collector and emitter being connected across the output terminals of said amplifier,
(c) and means coupling the base of said transistor to said circuit point so that the emitter-collector path of said transistor presents a low impedance discharge path for said capacitor when said amplifier is non-conducting.

13. A circuit for charging a first capacitor to a voltage which is a linear function of the voltage across a second capacitor, said circuit comprising,
(a) a high input impedance transistor amplifier including a transistor output stage, the collector of said transistor being connected through a resistor to a source of unidirectional potential and the emitter of said transistor being connected through a second resistor to the opposite side of said source of unidirectional potential, said first capacitor coupled across said second resistor and said second capacitor coupled to the input of said amplifier,
(b) a second transistor having a base, an emitter and a collector, the emitter-collector path of said second transistor connected across said second resistor and the base of said second transistor being coupled to the collector of said first mentioned transistor.

No references cisted.

ARTHUR GAUSS, *Primary Examiner.*

JAMES BUSCH, *Assistant Examiner.*